Figure 1:
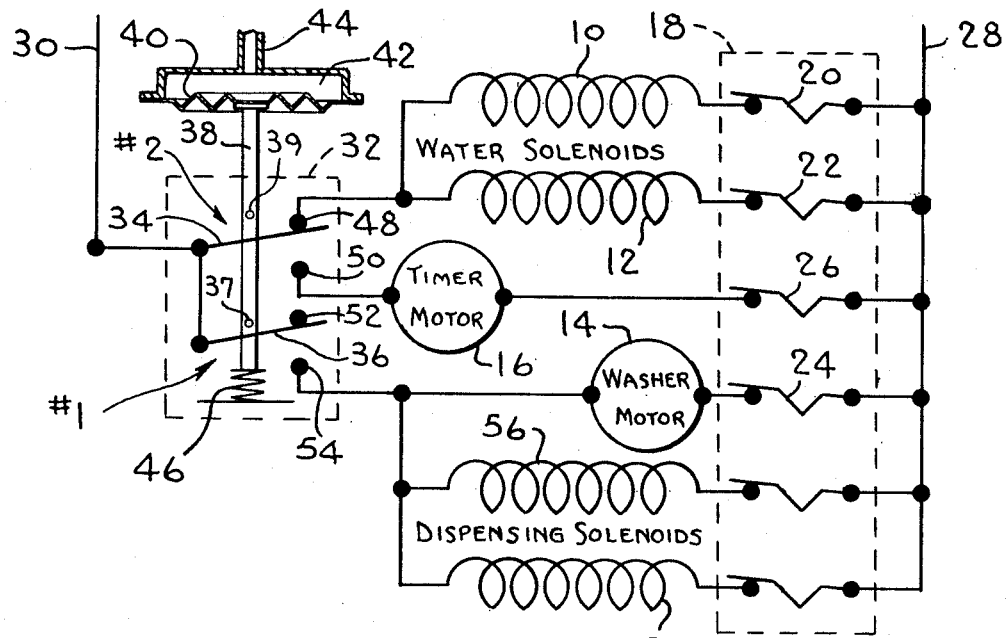

May 19, 1964     I. GEBEL     3,133,433

AUTOMATIC WASHING MACHINE WITH PRESSURE SWITCH MEANS

Filed May 24, 1962

INVENTOR.
IRVING GEBEL
BY
Bayard H. Michael
ATTORNEY

United States Patent Office 3,133,433
Patented May 19, 1964

3,133,433
AUTOMATIC WASHING MACHINE WITH
PRESSURE SWITCH MEANS
Irving Gebel, Oak Park, Ill., assignor to Controls Company of America, Schiller Park, Ill., a corporation of Delaware
Filed May 24, 1962, Ser. No. 197,336
6 Claims. (Cl. 68—12)

This invention relates to a washing machine control system.

To avoid damaging the clothing in an agitator washer there must be water in the tub before the agitate cycle starts and prior art control arrangements prevented start of agitation until the prescribed water level was in the tub. In order to insure the full time of agitation the timer advance is interrupted during the fill cycle with the result that the fill time added to the overall program time: The time thus added is particularly appreciable under low water pressure conditions which prolong the fill time. I have found that the agitate cycle can be safely started with a partial fill and this makes possible a shortening of the overall program time by devising a control system which will start the agitation cycle in a partial fill while continuing the fill until the desired level is obtained.

An object of this invention is to shorten the overall cycle program time of a washing machine.

In carrying out the above objective I provide a system including a pressure switch (sensing water level in the tub) sequentially operating two single pole, double throw switches one of which closes the washing machine motor circuit (to agitate) when a part fill is obtained while the second switch does not act to close the timer motor circuit and open the water valve circuits(s) until the complete fill is obtained. Thus agitation is started earlier and the timed agitate cycle can be shortened.

Another object is to make possible earlier dispensing of detergents or fabric conditioners and this is accomplished by energizing the dispense circuits when the agitate circuit is energized. This injects the solutions at the earliest possible time (it being undesirable to inject the solutions into an empty tub).

Another object is to achieve a novel control over water temperature by having the fill start with cold water only which is thought to have merit in extending fabric life. This is done by having the pressure switch act to open the hot water valve only after the minimum agitate level is reached. Therefore, the fill starts with cold water, the hot is blended in and, agitate starts on a part fill and all water is cut off and the timer is energized when full fill is reached.

Figure 2:
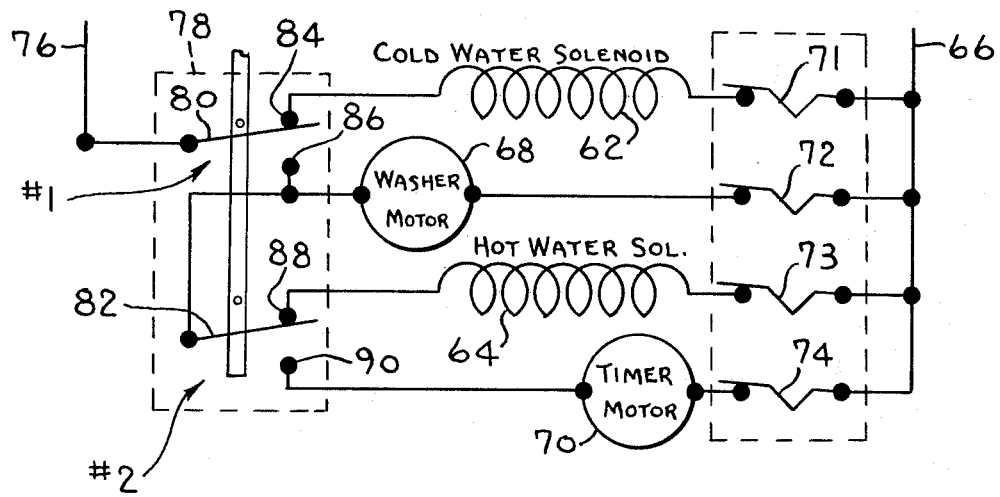

Other objects and advantages will be pointed out in, or be apparent from, the specification and claims, as will obvious modifications of the embodiments shown in the drawings, in which:

FIG. 1 is a schematic illustration of a control mechanism arranged in accordance with the invention; and FIG. 2 is a schematic illustration of another control mechanism arranged in accordance with this invention.

A washing machine usually includes solenoids 10 and 12 for operating the hot and cold water valves, washing machine drive motor 14 and timer motor 16. The timer motor, as is well known in the art, drives a plurality of cam discs (not shown) which are operative to selectively actuate individual timer switches illustrated in schematic timer bank 18. Electrical connection of solenoids 10 and 12 to power supply line 28 is made through timer switches 20 and 22 respectively, and washer motor 14 and timer motor 16 are electrically connected to the power supply through timer switches 24 and 26 respectively. The assembly comprising the solenoids 10 and 12, timer motor and agitator motor is connected to the other side of the power supply (line 30) through pressure switch 32.

Pressure switch 32 preferably includes sequentially operated single pole, double throw switches #1 and #2 which respectively include blades 36 and 34. The switch blades are engaged by an actuating stem 38, for example, through pins 37 and 39. The stem is connected to a diaphragm 40 which seals a chamber 42 connected to the washing machine tub, through a tube 44 so that diaphragm 40 is movable in response to variations in the water head in the washing machine, and the stem 38 is moved accordingly. Actuating stem 38 is moved by diaphragm 40 against a spring 46 to sequentially acuate the switches. The spacing of pins 37 and 39 from their respective switch blades is set so that the switch blades are acuated in response to different amounts of travel of actuating stem and, accordingly, different water heads in the washing machine.

In the preferred embodiment movable switch blade 34 is operative to selectively engage water valve contact 48 or timer motor contact 50. Movable switch blade 36, upon actuation by actuating stem 38, is moved from dead contact 52 to motor contact 54 to complete a circuit through washer motor 14. At the start of a fill cycle, switch #2 energizes the water valves and switch #1 is on the dead contact. The circuits through the timer and washer motors are open so that neither motor is energized during the initial stages of the water fill cycle. When a predetermined water level is reached in the washing machine the pressure switch actuates switch #1 to move switch blade 36 to motor contact 54 for energization of the motor to start the agitate cycle. The start of the agitate cycle occurs subsequent to the start of the fill operation of the washing machine and prior to the completion thereof so that there is an overlap of the cycles during the final stage of the water fill cycle. When the water has reached the preselected level in the tub the pressure switch actuates switch #2 to move switch blade 34 away from contact 48, to de-energize the water valve solenoids into engagement with the timer contact 50 to energize the timer motor and start the timer. Since the agitate cycle was initiated prior to completion of the fill cycle, the period of the agitate cycle provided by the timer mechanism can be reduced a corresponding amount to effectuate an overall reduction in the washer program time.

It will be appreciated that the circuit illustrated and the preceding discussion are concerned only with the fill and agitate cycles of the washing machine and that additional circuitry would be provided for control by the timer of other washer functions such as pump-out and spin.

If desired, the above described control mechanism can also be utilized to control the energization of a dispenser for injecting detergent, bleach, bluing, etc. during the agitate cycle. The dispensing means may include solenoids 56 and 58 (or other mechanisms) which are electrically connected in the same circuit as the agitator motor to be controlled by switch #1.

Another example of incorporation of a multiple circuit pressure switch in a washing machine control system is illustrated in FIG. 2. In this figure the timer switches 71, 72, 73 and 74 would be closed at the start of a fill cycle so the pressure switch 78 controls power supply from lines 66, 76 to the water valve solenoids 62, 64 and the motors 68, 70. Blade 80 of switch #1 normally (empty) closes on cold water contact 84 and there is no power supply to hot solenoid 64 or the motors. When part fill trips switch #1 the blade contacts contact 86 to energize the washer motor and also energize switch #2 which is still in its normal position with blade 82 on hot water contact 88 to start hot water flow (cold having now been cut off by switch #1 unless the circuit is provided with an added circuit to the cold solenoid through contact 86 and an added switch on the timer). When switch #2 trips, blade 82 moves to timer contact 90 to re-start the timer.

Although this invention has been illustrated and described in connection with particular embodiments thereof it will be apparent to those skilled in the art that various changes and modifications may be made therein without departing from the spirit of the invention or from the scope of the appended claims.

What I claim is:

1. In a washing machine including a timer motor, a washer motor, a water valve solenoid, and solenoid operated dispensing means electrically connected in circuit with said washer motor; pressure switch means responsive to the water head in said washing machine and including at least a pair of independently operable switch means, one of said switch means operative to energize said water valve solenoid and when the water in said washing machine reaches a full level operative to de-energize said water valve solenoid and energize said timer motor, the other of said switch means operative to energize said washer motor and said dispensing solenoid subsequent to energization of said water fill solenoid when the water in said washing machine reaches a predetermined level and prior to reaching a full level.

2. In a washing machine including a timer motor, a washer motor, a water valve solenoid and solenoid operated dispensing means electrically connected in circuit with said washer motor; multiple circuit pressure switch means including independently operable switch means, said pressure switch means operative in response to the water level in said washing machine to actuate said switch means to energize said washer motor and dispensing solenoid subsequent to energization of said water valve solenoid and prior to the water in said washing machine reaching a full level, said pressure switch means further operative to maintain energization of said water valve solenoid until said water fill cycle is completed whereupon said water valve solenoid is de-energized and said timer motor is energized.

3. In a washing machine including a timer, a washer drive, water valve means and dispensing means; control means responsive to the water level in said washing machine and operative to energize said washer drive and dispensing means subsequent to energization of said water valve means and prior to the water in said washing machine reaching a full level and to maintain energization of said water valve means until the water reaches a full level whereupon said water valve means is de-energized and said timer is energized.

4. In a washing machine, including a first solenoid operated water valve mechanism for supplying water at a first temperature to said washing machine, a second solenoid operated water valve mechanism for supplying water at a second temperature to said washing machine, and a washer motor; control means responsive to the water level in said washing machine, said control means operative subsequent to energization of said first solenoid and when a predetermined water level is reached in said washing machine to de-energize said first solenoid and energize said washer motor and said second solenoid to complete the water fill operation of said washing machine whereupon said pressure switch is operative to de-energize said second solenoid.

5. In a washing machine including a hot water solenoid, a cold water solenoid, a timer motor and a washer motor; pressure switch means responsive to the water head within said washing machine, said pressure switch means operative to energize said cold water solenoid and electrically isolate said washer motor, said hot water solenoid and said timer motor, and when a predetermined level is reached in said washing machine and prior to reaching a full level being operative to de-energize said cold water solenoid and energize both said hot water solenoid and said washer motor, said pressure switch means further operative when a full water level is reached in said washing machine to de-energize said hot water solenoid and energize said timer motor.

6. In a washing machine including a hot water solenoid, a cold water solenoid, a washer motor and a timer motor; a pressure switch including first and second independently operable switch means and operative in response to the water level in said washing machine to actuate said first switch means to selectively energize said cold water solenoid and said washer motor and to actuate said second switch means to selectively energize said hot water solenoid and said timer motor, said first switch means energizing said cold water solenoid and electrically isolating said second switch means so that said hot water solenoid and said timer motor are de-energized, said first switch means operative when a predetermined water level is reached in said washing machine and prior to reaching a full water level to de-energize said cold water solenoid and energize said washer motor and said second switch means, said second switch means energizing said hot water and when the water in said washing machine reaches a full level de-energizing said hot water solenoid and energizing said timer motor.

References Cited in the file of this patent
UNITED STATES PATENTS

| | | |
|---|---|---|
| 2,471,778 | Ringer | May 31, 1949 |
| 2,709,908 | Altorfer | June 7, 1955 |
| 2,955,448 | Olthuis | Oct. 11, 1960 |
| 2,986,915 | Nau | June 6, 1961 |

FOREIGN PATENTS

| | | |
|---|---|---|
| 629,687 | Canada | Oct. 24, 1961 |
| 720,245 | Great Britain | Dec. 15, 1954 |